US005849187A

United States Patent [19]

Plaisier

[11] Patent Number: 5,849,187

[45] Date of Patent: Dec. 15, 1998

[54] FILTER ELEMENT HAVING A FILTRATION PART AND FRAME

[76] Inventor: Leendert Plaisier, Prinses Irenelaan 4, NL-1911 HW Uitgeest, Netherlands

[21] Appl. No.: 464,748

[22] PCT Filed: Dec. 21, 1993

[86] PCT No.: PCT/NL93/00272

§ 371 Date: Jun. 22, 1995

§ 102(e) Date: Jun. 22, 1995

[87] PCT Pub. No.: WO94/14518

PCT Pub. Date: Jul. 7, 1994

[30] Foreign Application Priority Data

Dec. 23, 1992 [NL] Netherlands ........................... 9202237

[51] Int. Cl.$^6$ .................................................... B01D 27/08

[52] U.S. Cl. .......................... 210/445; 210/451; 210/488; 210/495; 55/495; 55/502; 55/511; 55/525; 55/DIG. 31

[58] Field of Search .............................. 55/490, 492, 495, 55/497, 498, 501, 502, 511, 525, DIG. 31; 210/445, 451, 455, 459, 488, 489, 494.3, 495, 497.01

[56] References Cited

U.S. PATENT DOCUMENTS

| | | | |
|---|---|---|---|
| 2,328,148 | 8/1943 | Jacobowitz . | |
| 4,737,174 | 4/1988 | Pontius | 55/511 |
| 5,032,272 | 7/1991 | Mould | 55/511 |
| 5,188,646 | 2/1993 | Nolen, Jr. | 55/DIG. 31 |
| 5,192,347 | 3/1993 | Lee | 55/511 |
| 5,269,917 | 12/1993 | Stankowski | 210/455 |
| 5,310,482 | 5/1994 | Sather | 210/495 |
| 5,329,739 | 7/1994 | Madl, Jr. | 52/762 |
| 5,476,526 | 12/1995 | Attermeyer | 55/496 |
| 5,505,755 | 4/1996 | Ernst | 55/DIG. 31 |
| 5,609,937 | 3/1997 | Reinstad | 428/358 |

FOREIGN PATENT DOCUMENTS

| | | | |
|---|---|---|---|
| 2053144 | 1/1993 | Canada | 55/DIG. 31 |
| 1611075 | 9/1970 | Germany . | |
| 1-254219 | 10/1989 | Japan . | |
| 3249912 | 11/1991 | Japan | 55/DIG. 31 |

OTHER PUBLICATIONS

'New and Different Filter Frame Concept', Manufactured by Weather–Rite Filter Co., 1967.

*Primary Examiner*—W. L. Walker
*Attorney, Agent, or Firm*—Harrison & Egbert

[57] ABSTRACT

A filter element including a filtration part and a mounting frame retaining the filtration part therein. The frame is formed by a profile with a center part and two border parts. The filtration part is retained between the border parts. The border parts are positioned in generally parallel relation to each other. A strip of material is firmly fixed to the border parts such that one end of the strip is fixed to one of the border parts and an opposite end is affixed to the other of the two border parts. The strip is in generally parallel relation to the center part.

7 Claims, 3 Drawing Sheets

FILTER ELEMENT HAVING A FILTRATION PART AND FRAME

TECHNICAL FIELD

The invention relates to a filter element, whereby the filter element is intended to be installed standing or hanging within a filter vessel, and whereby the filter element is formed by a filtration part and a supporting or mounting frame for the retaining of the filtration part, which frame has a substantially U-shaped section and is formed by a profile having a center part and two opposite border parts, between which border parts the filtration part can be enclosed.

BACKGROUND ART

When manufacturing an existing filter element the filtration part is slided between the border parts into the profile at a distance from the center part, after which the border parts are fastened onto the filtration part. This generally takes place by connecting the border parts together with the filtration part placed therein between by means of rivets. During the bending of the profile into a shape which is adapted to the measurements of the filtration part, as well as during the mounting of the filtration part into the profile, it is possible that the two opposite border parts are displaced with respect to each other, which displacement of the border parts with respect to one another is continued along the entire periphery of the frame. With a finished element the aforesaid displacement is only partly prevented by the rivet connection, and the element may easily become deformed.

This is considered a drawback.

Also, the lack of torsional stiffness of the known filter element has a very negative influence on the maneuverability of the element.

The invention aims to obviate this drawback of the known filter element.

SUMMARY OF THE INVENTION

The filter element according to the invention overcomes the drawback by firmly fixing between and onto the two opposite border parts of the profile a strip of material.

According to a further characteristic of the filter element according to the invention, two or more strips of material are placed at a distance from one another in the longitudinal direction of the profile.

The strip or the strips may thereby be mounted in various ways.

According to a characteristic of the filter element according to the invention the strip or strips are placed extending parallel to the longitudinal direction of the profile.

According to a further characteristic the strip or strips are placed at a distance from the centre part.

Other features and characteristics of the filter element according to the invention will be explained with reference to the drawings of an embodiment by way of example.

DETAILED DESCRIPTION OF THE INVENTION

Figure 1:
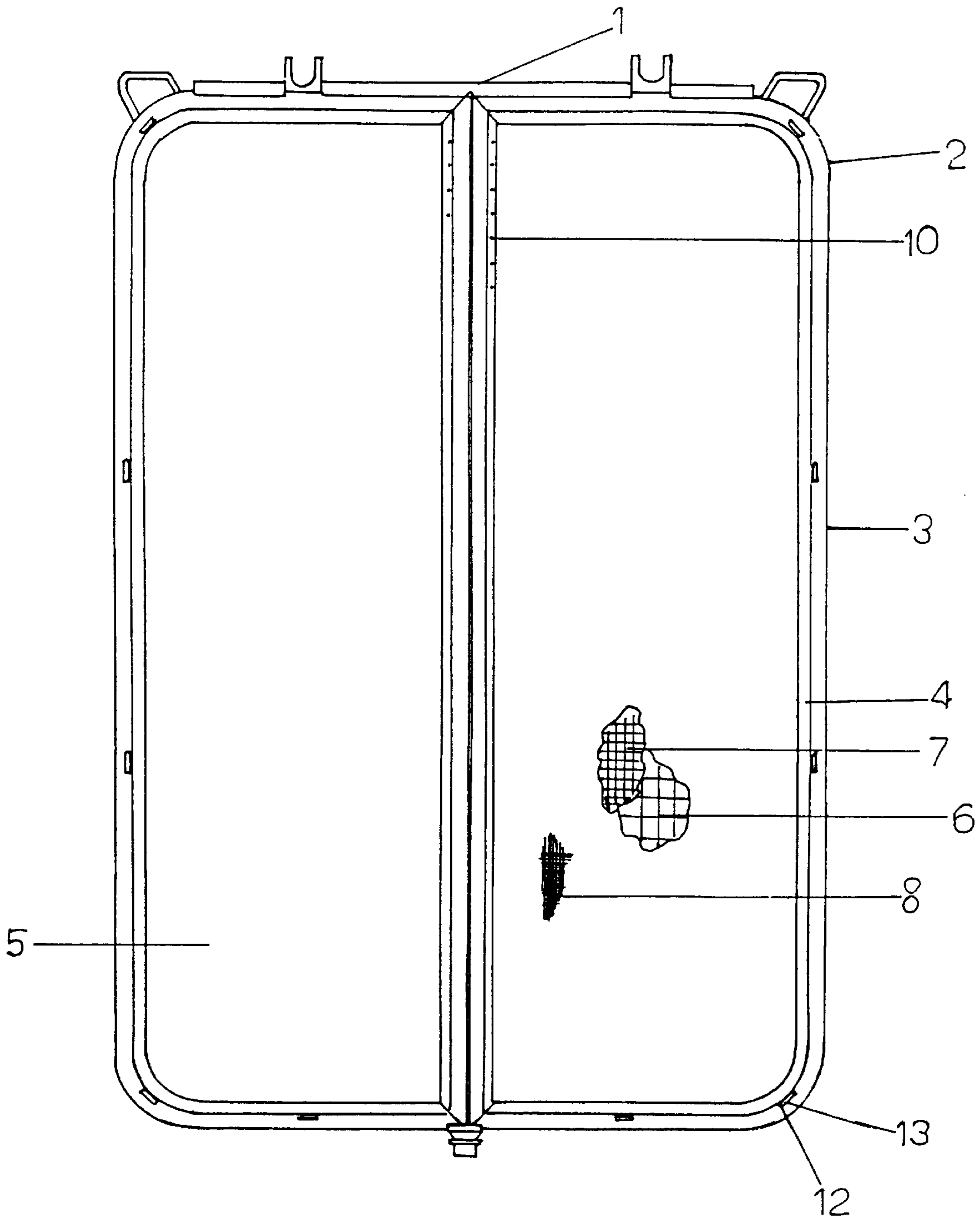
FIG. 1 is a front view of a filter element according to the invention.
Figure 2:
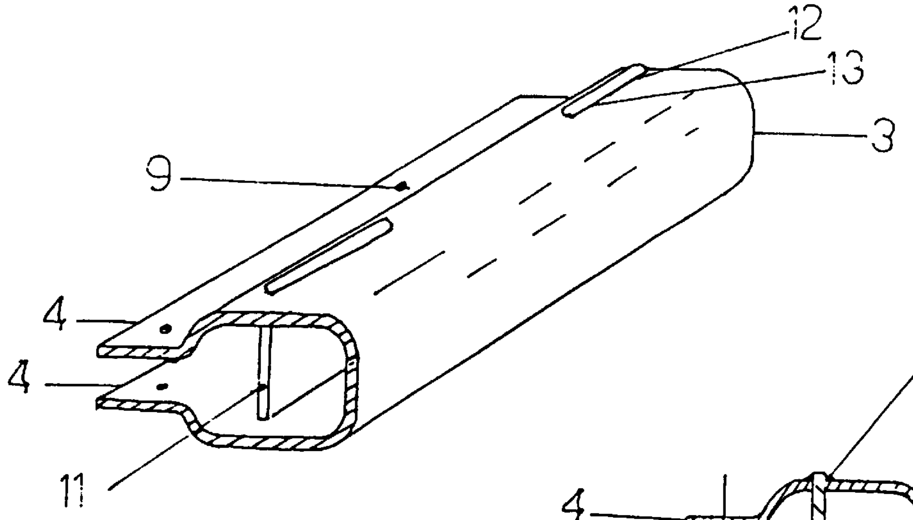
FIG. 2 is a perspective view of a part of a profile according to the invention.
Figure 3:
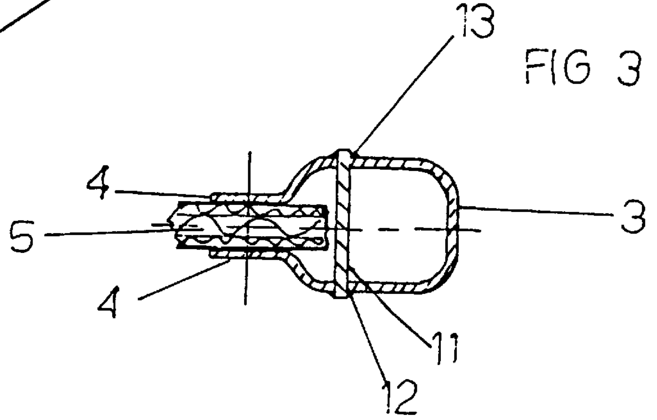
FIG. 3 is a cross section of the profile.

As is shown in FIG. 1, the filter element is formed by a supporting or mounting frame 1, which is formed by a profile 2 having a substantially U-shaped section, with a center part 3 and, as shown in FIGS. 2 and 3, two oppositely disposed border parts 4. Between the border parts 4 the filtration part 5 is retained, which may consist of a heavy wire netting 6 over both sides of which a support gauze 7 is applied, and over which a filter gauze 8 is applied.

As is shown in FIG. 3, the filtration part is slidably positioned at a distance from the center part 3 between the border parts 4 of the frame.

The two border parts are further provided with openings 9 for the rivet connection 10.

In the example of an embodiment according to the invention, between the border parts 4 which extend parallel to the longitudinal direction of the profile, a strip 11 is placed, which in this example of an embodiment is placed within a slot 12, which is present in both border parts. The strip is mounted in the border parts by means of a weld connection 13.

Figure 4:
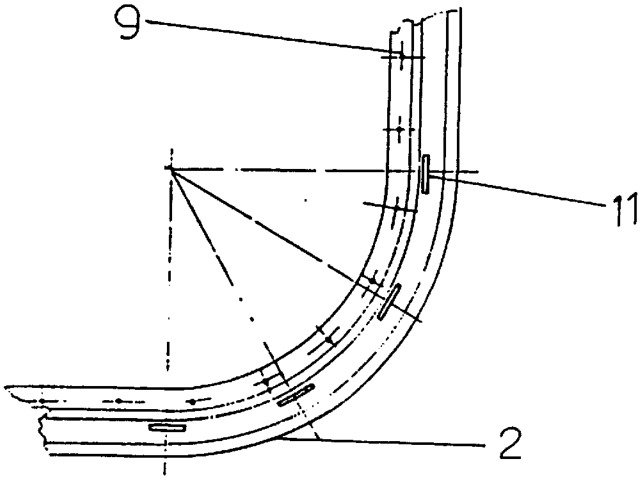
FIG. 4 is a part of a profile shaped into a bend.

As shown in FIG. 4, multiple strips may be placed in the longitudinal direction of the profile, for example in a bent section of the profile.

Figure 5B:
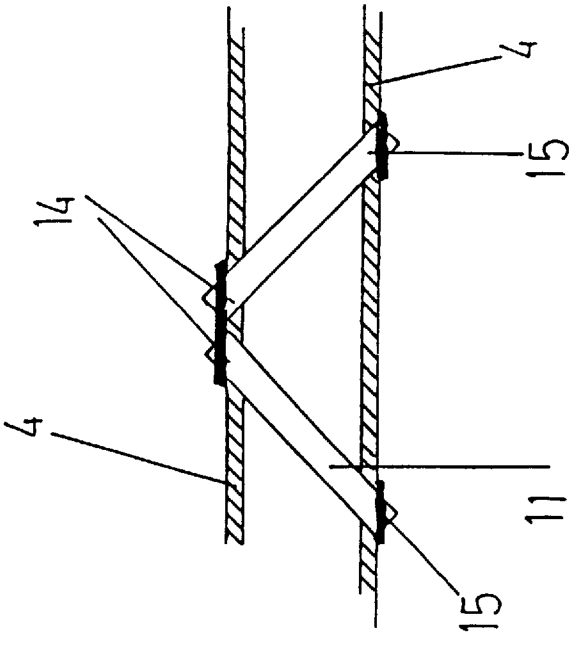
FIG. 5*a* and 5*b* are cross sections respectively of a longitudinal section of another embodiment of the filter element according to the invention.
Figure 5A:
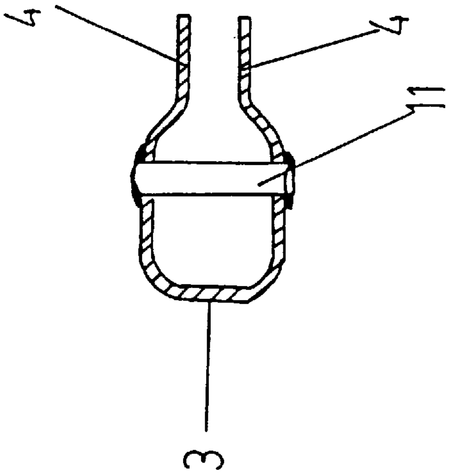

FIGS. 5*a* and 5*b* show another embodiment of the filter element according to the invention. Two strips of material 11 are mounted such that, at on border part 4, they meet with their end parts 14, while at the opposite border part the strips 11 with their other end parts 15 are spaced apart.

The end parts 14 form an angle of 90 degrees with respect to each other, and the end parts 15 form an angle of 45 degrees with respect to the border part 4 to which they are attached.

The filter element according to the invention in comparison with the known filter elements has a greater ability to retain its form and is much stiffer during handling.

I claim:

1. A filter element comprising:

a filtration part;

a mounting frame retaining said filtration part interior thereof, said frame being formed by a profile with a center part and two border parts, said filtration part being permanently retained between said border parts, said border parts positioned in generally parallel relation to each other; and a strip of material being firmly fixed to said border parts, one end of said strip being affixed to one of said two border parts, an opposite end of said strip being affixed to another of said two border parts, said strip being in generally parallel relation to a surface of said center part said strip of material comprising two or more strips placed in a longitudinal direction of the profile at a spaced distance from each other.

2. The filter element according to claim 1 wherein the profile and the strip are formed of metal.

3. The filter element according to claim 1 wherein the strip is mounted onto the border parts by a weld connection.

4. A filter element comprising:

a filtration part;

a mounting frame retaining said filtration part interior thereof, said frame being formed by a profile with a center part and two border parts, said filtration part being permanently retained between said border parts, said border parts positioned in generally parallel relation to each other; and a strip of material being firmly fixed to said border parts, one end of said strip being affixed to one of said two border parts, an opposite end of said strip being affixed to another of said two border parts, said strip being in generally parallel relation to a surface of said center part, said strip of material being mounted between the border parts at a spaced distance from the center part.

5. A filter element comprising:

a filtration part;

a mounting frame retaining said filtration part interior thereof, said frame being formed by a profile with a center part and two border parts, said filtration part being permanently retained between said border parts, said border parts positioned in generally parallel relation to each other; and a strip of material being firmly fixed to said border parts, one end of said strip being affixed to one of said two border parts, an opposite end of said strip being affixed to another of said two border parts, said strip being in generally parallel relation to a surface of said center part, said two or more strips of material being mounted such that at one border part the ends of the strips meet, the opposite ends of the strips at the opposite border part being spaced apart.

6. The filter element according to claim 5 wherein the strips are mounted at an angle of 90 degrees with respect to each other.

7. A filter element comprising:

a filtration part;

a mounting frame retaining said filtration part interior thereof, said frame being formed by a profile with a center part and two border parts, said filtration part being permanently retained between said border parts, said border parts positioned in generally parallel relation to each other; and a strip of material being firmly fixed to said border parts, one end of said strip being affixed to one of said two border parts, an opposite end of said strip being affixed to another of said two border parts, said strip being in generally parallel relation to a surface of said center part, said strip being inserted in a slot provided in each of the border parts.

* * * * *